(12) United States Patent
Horiuchi et al.

(10) Patent No.: US 7,722,980 B2
(45) Date of Patent: May 25, 2010

(54) SOLID OXIDE FUEL CELL DIRECTLY UTILIZING FLAME

(75) Inventors: Michio Horiuchi, Nagano (JP); Yasue Tokutake, Nagano (JP); Shigeaki Suganuma, Nagano (JP); Misa Watanabe, Chandler, AZ (US)

(73) Assignee: Shinko Electric Industries Co., Ltd., Nagano (JP)

( * ) Notice: Subject to any disclaimer, the term of this patent is extended or adjusted under 35 U.S.C. 154(b) by 104 days.

(21) Appl. No.: 11/486,268

(22) Filed: Jul. 12, 2006

(65) Prior Publication Data

US 2007/0015044 A1  Jan. 18, 2007

(30) Foreign Application Priority Data

Jul. 13, 2005  (JP) .............. 2005-204727

(51) Int. Cl.
*H01M 4/00* (2006.01)
*H01M 8/10* (2006.01)

(52) U.S. Cl. .............. 429/44; 429/40; 429/30

(58) Field of Classification Search ............ 429/18–35, 429/304, 40, 44
See application file for complete search history.

(56) References Cited

U.S. PATENT DOCUMENTS

| | | | | |
|---|---|---|---|---|
| 5,925,477 A | * | 7/1999 | Ledjeff et al. ............ | 429/32 |
| 6,127,058 A | * | 10/2000 | Pratt et al. ............... | 429/30 |
| 6,428,920 B1 | | 8/2002 | Badding et al. | |
| 2003/0082436 A1 | | 5/2003 | Hong et al. | |
| 2004/0086761 A1 | * | 5/2004 | Horiuchi et al. .......... | 429/30 |

FOREIGN PATENT DOCUMENTS

| | | |
|---|---|---|
| DE | 4033284 | 2/1991 |
| DE | 19718687 | 11/1998 |
| EP | 0682379 A1 | 11/1995 |
| EP | 1508932 A2 | 2/2005 |
| JP | 2004-139936 | 5/2004 |
| JP | 2005-063692 | 3/2005 |
| JP | 2005-071628 | 3/2005 |
| WO | WO03/092046 A2 | 11/2003 |

OTHER PUBLICATIONS

Euorpean Search Report dated Sep. 6, 2006.

* cited by examiner

*Primary Examiner*—Dah-Wei D Yuan
*Assistant Examiner*—Claire L Rademaker
(74) *Attorney, Agent, or Firm*—Chadbourne & Parke LLP; Walter G. Hanchuk (57) ABSTRACT

A solid oxide fuel cell that directly utilizes a flame according to the present invention has a solid oxide substrate, a cathode electrode layer formed on one surface, and an anode electrode layer 3 formed on the opposite surface and a platinum mesh is embedded in the entire surfaces of the solid cathode electrode layer and the anode electrode layer. An oxide layer covers the entire periphery of the solid oxide substrate from the end part of the cathode electrode layer to the end part of the anode electrode layer. Due to the platinum mesh and the oxide layer, thermal shock due to rapid heating by a flame is alleviated and cracking in the solid oxide substrate is prevented from occurring.

8 Claims, 3 Drawing Sheets

SOLID OXIDE FUEL CELL DIRECTLY UTILIZING FLAME

CROSS-REFERENCE TO RELATED APPLICATION

This application claims the priority of Japanese Patent Application Number 2005-204727, filed on Jul. 13, 2005.

BACKGROUND OF THE INVENTION

1. Field of the Invention

The present invention relates to a solid oxide fuel cell applicable to a power generating apparatus and, more particularly, to a solid oxide fuel cell, having a simple structure that does not require hermetic sealing, in which a cathode electrode layer and an anode electrode layer, each having a current collecting electrode, are formed on a solid oxide substrate, wherein power can be generated by directly exposing the fuel cell to a premixed gas combustion flame produced by burning, the thermal shock due to rapid heating by a flame is alleviated, and cracking at the periphery of the substrate is prevented from occurring.

2. Description of the Related Art

Fuel cells so far developed can be classified into various types according to the method of power generation, one being the type of solid oxide fuel cell that uses a solid electrolyte. In one example of the fuel cell that uses a solid electrolyte, a calcined structure made of yttria ($Y_2O_3$)-doped stabilized zirconia is used as an oxygen-ion-conducting solid oxide substrate. This fuel cell comprises a cathode electrode layer formed on one surface of the solid oxide substrate and an anode electrode layer on the opposite surface thereof, and oxygen or an oxygen-containing gas is supplied to the cathode electrode layer, while a fuel gas such as methane is supplied to the anode electrode layer.

In this fuel cell, the oxygen ($O_2$) supplied to the cathode electrode layer is converted into oxygen ions ($O^{2-}$) at the boundary between the cathode electrode layer and the solid oxide substrate, and the oxygen ions are conducted through the solid oxide substrate into the anode electrode layer where the ions react with the fuel gas, for example, a methane gas ($CH_4$), supplied to the anode electrode layer, producing water ($H_2O$), carbon dioxide ($CO_2$), hydrogen ($H_2$), and carbon monoxide (CO). In this reaction process, the oxygen ions release electrons, and a potential difference therefore occurs between the cathode electrode layer and the anode electrode layer. When lead wires are attached to the cathode electrode layer and the anode electrode layer, the electrons in the anode electrode layer can flow into the cathode electrode layer via the lead wires, and the fuel cell thus generates electric power. The operating temperature of this fuel cell is about 1,000° C.

However, such a type of solid oxide fuel cell requires the provision of separate chambers, one being an oxygen or oxygen-containing gas supply chamber on the cathode electrode layer side and the other a fuel gas supply chamber on the anode electrode layer side. Then, the fuel cell is heated to the driving temperature by a heater provided outside the separate chamber. However, if heated rapidly, cracking occurs in the solid oxide fuel cell and the generation of power is no longer possible, therefore, it has been necessary to gradually heat the fuel cell, when it is started, over a long period of time. Furthermore, as the fuel cell is exposed to oxidizing and reducing atmospheres at high temperatures, it has been difficult to increase the durability of the solid oxide fuel cell.

On the other hand, there has been developed a fuel cell of the type that comprises a fuel cell fabricated by forming a cathode electrode layer and an anode electrode layer on opposite surfaces of a solid oxide substrate, and that generates an electromotive force between the cathode electrode layer and the anode electrode layer by placing the fuel cell unit in a fuel gas mixture consisting of a fuel gas, for example, a methane gas, and oxygen. The principle of generating an electromotive force between the cathode electrode layer and the anode electrode layer is the same for this type of fuel cell as for the above-described separate-chamber type fuel cell but, as the whole fuel cell can be exposed to substantially the same atmosphere, the fuel cell can be constructed as a single-chamber type cell to which the fuel gas mixture is supplied, and this serves to increase the durability of the fuel cell.

However, in this single-chamber fuel cell also, as the fuel cell has to be operated at a high temperature of about 1,000° C., there is the danger that the fuel gas mixture may explode. Here, if the oxygen concentration is reduced to a level lower than the ignitability limit to avoid such danger, there occurs the problem that carbonization of the fuel, such as methane, progresses and the fuel cell performance degrades. In view of this, there has been developed a single-chamber fuel cell that can use a fuel gas mixture whose oxygen concentration is adjusted so as to be able to prevent the progress of carbonization of the fuel while, at the same time, preventing an explosion of the fuel gas mixture.

The fuel cell so far described is of the type that is constructed by housing the fuel cell in a chamber having a hermetically sealed structure, on the other hand, and there is proposed an apparatus that generates power by placing a solid oxide fuel cell in or near a flame and thereby holding the solid oxide fuel cell at its operating temperature by the heat of the flame.

The fuel cell used in the above-proposed power generating apparatus comprises a zirconia solid oxide substrate formed in a tubular structure, a cathode electrode layer as an air electrode formed on the inner circumference of the tubular structure, and an anode electrode layer as a fuel electrode formed on the outer circumference of the tubular structure. This solid oxide fuel cell using the solid electrolyte is placed with the anode electrode layer exposed to a reducing flame portion of a flame generated from a combustion device to which the fuel gas is supplied. In this arrangement, radicals, etc. present in the reducing flame can be utilized as the fuel, while air, as an oxygen-containing gas, is supplied by convection or diffusion to the cathode electrode layer inside the tubular structure, and the solid oxide fuel cell thus generates electric power.

The above-described single-chamber fuel-cell obviates the necessity of strictly separating the fuel and the air as was the case with conventional solid oxide fuel cells, but instead has to employ an air-sealing construction. Further, to increase the electromotive force, a plurality of flat plate solid oxide fuel cells are stacked one on top of another and connected together using an interconnect material having high heat resistance and high electrical conductivity so as to be able to operate at high temperatures. As a result, the single-chamber fuel-cell device constructed from a stack of flat plate solid oxide fuel cells has the problem that the construction is not only large but also costly.

Furthermore, in operation, the temperature is gradually raised to the high operating temperature in order to prevent cracking of the solid electrolyte fuel cells, therefore, the single-chamber fuel-cell device requires a significant startup time, thus causing extra trouble to operate.

In contrast, the above-proposed solid oxide fuel cell of tubular structure employs a construction that directly utilizes a flame and this type of fuel cell has the characteristic of being an open type, the solid electrolyte fuel cell not needing to be housed in a hermetically sealed container. As a result, this type of fuel cell can reduce the startup time, is simple in structure, and is therefore advantageous when it comes to reducing the size, weight, and cost of the fuel cell. Further, as a flame is used directly, this type of fuel cell can be incorporated in a conventional combustion apparatus, or an incinerator or the like, and is thus expected to be used as a power supply apparatus.

However, in this type of fuel cell, as the anode electrode layer is formed on the outer circumference of the tubular solid oxide substrate, radicals due to the flame are not supplied, in particular, to the lower half of the anode electrode layer, and effective use cannot be made of the entire surface of the anode electrode layer formed on the outer circumference of the tubular solid oxide substrate. This has degraded the power generation efficiency. There has also been the problem that, as the solid oxide fuel cell is directly and unevenly heated by the flame, cracking tends to occur due to rapid changes in temperature.

In view of the above situation, Japanese Unexamined Patent Publication (Kokai) No. 2004-139936, for example, proposes a power generating apparatus using a solid oxide fuel cell as a handy power supply means, wherein improvements in durability and power generation efficiency and reductions in size and cost are achieved by employing a solid oxide fuel cell of the type that directly utilizes a flame produced by burning a fuel, and by making provisions to apply the flame over the entire surface of the anode electrode layer formed on a flat plate solid oxide substrate.

The solid oxide fuel cell used in the above-proposed power generating apparatus has a flat plate solid oxide substrate circular or rectangular in shape, a cathode electrode layer 2 as an air electrode formed on one surface of the substrate, and an anode electrode layer as a fuel electrode formed on the surface opposite to the one surface. The cathode electrode layer and the anode electrode layer are constructed so as to be arranged in opposition to each other via the solid oxide substrate.

As the solid oxide fuel cell is formed in a flat plate shape, the flame produced by a combustion device can be applied uniformly over the anode electrode layer of the solid oxide fuel cell, that is, compared with the tubular type, the flame can be applied more evenly. Furthermore, with the anode electrode layer disposed facing the flame, hydrocarbons, hydrogen, radicals (OH, CH, $C_2$, $O_2H$, $CH_3$), etc. present in the flame can be easily utilized as the fuel to generate power based on the oxidation-reduction reaction. Further, the cathode electrode layer is exposed to an oxygen-containing gas, for example, air and, therefore, the cathode electrode layer can be maintained in an oxygen-rich condition.

By the way, for the solid oxide fuel cell used in the power generating apparatus disclosed in the above-mentioned Japanese Unexamined Patent Publication (Kokai) No. 2004-139936, it has been proposed that the metal meshes or the metal wires be embedded or fixed at least in or to one of the anode electrode layer and the cathode electrode layer of the solid oxide fuel cell in order to prevent the power generating performance of the solid oxide fuel cell from degrading even if cracking occurs due to it being exposed directly to the flame.

As described above, one solid oxide fuel cell is formed on one solid oxide substrate, however, there may be the case where a plurality of fuel cells are formed on one solid oxide substrate as the solid oxide fuel cell and further the case where the solid oxide fuel cell is formed on each of a plurality of solid oxide substrates having a small area and the individual fuel cells are electrically connected to each other via wires to form a single fuel cell. In these cases also, it has been proposed in, for example, Japanese Unexamined Patent Publication (Kokai) No. 2005-71628, Japanese Unexamined Patent Publication (Kokai) No. 2005-63692, etc., that the metal meshes or the metal wires be embedded or fixed at least in or to one of the anode electrode layer and the cathode electrode layer of each fuel cell in order to prevent the power generating performance of the solid oxide fuel cell from degrading even if cracking occurs.

As described above, in the solid oxide fuel cell used in the so far proposed power generating apparatus, the metal meshes or the metal wires are embedded or fixed at least in or to one of the anode electrode layer and the cathode electrode layer of the solid oxide fuel cell in order to prevent the power generating performance of the solid oxide fuel cell from degrading even if cracking occurs due to being exposed directly to the flame. This means that because of the presence of the metal meshes or the metal wires, the individual fuel cells cracked and disintegrated in pieces are electrically connected in parallel as a result, therefore, the generation of power is not affected over the whole of the solid oxide fuel cell.

However, even in the case where the metal meshes or the metal wires are provided in each electrode layer, the individual fuel cells cracked and disintegrated in pieces are electrically connected in parallel by the metal meshes or the metal wires and the ability to generate electric power is maintained but, as described above, at the periphery part of the solid oxide substrate 1, the substrate surface is exposed with a predetermined width, therefore, there has been the problem that cracking occurs also in the periphery part of the solid oxide substrate on which none of the electrode layers is formed and, as a result, the solid oxide fuel cell cannot be used any more.

It is accordingly an object of the present invention to provide a solid oxide fuel cell having a simple structure, that does not require hermetic sealing, in which a cathode electrode layer and an anode electrode layer are formed on a solid oxide substrate, wherein electric power can be generated by directly exposing the fuel cell to a premixed gas combustion flame produced by burning, measures are taken to prevent cracking in the periphery part of the solid oxide substrate, the thermal shock due to rapid heating by the flame is alleviated, and cracking of the entire substrate is prevented from occurring.

SUMMARY OF THE INVENTION

To solve the above problems, a solid oxide fuel cell according to the present invention comprises: a cathode electrode layer formed on one surface of a solid oxide substrate; an anode electrode layer formed on a surface of the solid oxide substrate opposite from the one surface; and an oxide layer that covers the entire periphery part of the solid oxide substrate from the end part of the cathode electrode layer to the end part of the anode electrode layer, wherein metal meshes or metal wires are embedded or fixed at least in or to one of the cathode electrode layer and the anode electrode layer, the flame produced by burning is supplied to the anode electrode layer, an oxygen-containing gas is supplied to the cathode electrode layer and, thus, electric power is generated.

The cathode electrode layer and the anode electrode layer are formed so as to have an area smaller than the surface of the solid oxide substrate, the metal meshes or the metal wires embedded in or fixed to the cathode electrode layer and the anode electrode layer are first current collecting electrodes and second current collecting electrodes, and a power output is taken between lead wires connected to the first current collecting electrodes and the second current collecting electrodes.

The metal meshes and the metal wires are provided on the entire surface of the cathode electrode layer or the anode electrode layer and the oxide layer is formed in a solid electrolyte structure or in a porous structure.

Further, the solid oxide fuel cell comprises a plurality of cathode electrode layers in or to which the first current collecting electrodes are embedded or fixed formed on one surface of the solid oxide substrate, a plurality of anode electrode layers in or to which the second current collecting electrodes are embedded or fixed formed on a surface of the solid oxide substrate opposite from the one surface, and a plurality of solid oxide fuel cells formed on the solid oxide substrate, wherein the surface of the solid oxide substrate between the plurality of cathode electrode layers and between the plurality of anode electrode layers is covered with the oxide layer.

Furthermore, in the solid oxide fuel cell according to the present invention, the metal meshes or the metal wires have an area exceeding the entire surface of the cathode electrode layer or the anode electrode layer and the portion of the metal meshes and the metal wires is covered with the oxide layer.

Still furthermore, the metal meshes or the metal wires provided in the anode electrode layer or the cathode electrode layer are connected to the cathode electrode or the anode electrode layer of another neighboring solid oxide fuel cell or metal meshes or metal wires provided in the anode electrode layer or the cathode electrode layer.

As described above, in the solid oxide fuel cell according to the present invention, the metal meshes or the metal wires are provided in the cathode electrode layer or the anode electrode layer, or in both and the oxide layer that covers the entire periphery part of the solid oxide substrate from the end part of the cathode electrode layer to the end part of the anode electrode layer is formed, therefore, when power generation is started using the solid oxide fuel cell, even if the fuel cell is rapidly exposed to a flame, the entire periphery part of the solid oxide substrate is reinforced by the oxide layer and the occurrence of thermal stress is alleviated at the periphery part. Therefore, the thermal shock resistance at the periphery part of the solid oxide substrate of the solid oxide fuel cell is increased and cracking can be prevented.

Further, in the solid oxide fuel cell according to the present invention, the metal meshes or the metal wires as current collecting electrodes have an area exceeding the surface of the cathode electrode layer or the anode electrode layer or the total surface of both and the portion of the metal meshes or the metal wires is covered with the oxide layer together with the entire periphery part of the solid oxide substrate, therefore, the thermal shock resistance of the solid oxide substrate can be increased while effectively preventing short circuit between electrodes.

According to the solid oxide fuel cell of the present invention described above, the fact that a fuel cell of direct flame type has a simple structure that does not require hermetic sealing and is capable of easily generating electric power, wherein cracking in the periphery part of the substrate can be prevented from occurring while not only its handling is being simplified but also its thermal shock resistance being increased, allows rapid heating by a flame and is effective to shorten the startup time of the fuel cell.

BRIEF DESCRIPTION OF THE DRAWINGS

Other features, objects and advantages of the present invention will become apparent from the following description of preferred embodiments with reference to the drawings in which like reference character designate like or corresponding parts throughout several views, and in which.

DESCRIPTION OF THE PREFERRED EMBODIMENT

Embodiments of a solid oxide fuel cell that directly utilizes a flame according to the present invention will be described below with reference to the drawings. However, before proceeding to the description of the solid oxide fuel cell of the present embodiments, a previously proposed solid oxide fuel cell system will be described in order to clarify the features and advantages of the present embodiments.

Figure 4:
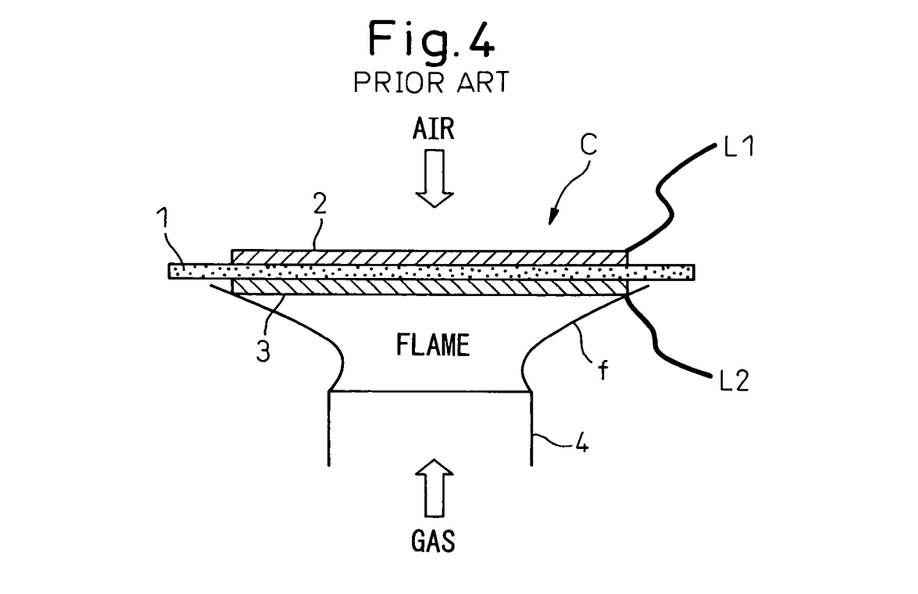
FIG. 4 is a diagram for explaining a use condition of a solid oxide fuel cell according to the prior art.

FIG. 4 shows a power generating apparatus using a solid oxide fuel cell proposed in the above-mentioned patent document. A solid oxide fuel cell C used in the power generating apparatus shown in FIG. 4 comprises a flat plate solid oxide substrate 1 circular or rectangular in shape, a cathode electrode layer 2 as an air electrode formed on one surface of the substrate, and an anode electrode layer 3 as a fuel electrode formed on the opposite surface thereof. The cathode electrode layer 2 and the anode electrode layer 3 are disposed in such a manner as to face each other with the solid oxide substrate 1 interposed therebetween.

The power generating apparatus is constructed using the thus constructed solid oxide fuel cell C; more specifically, the fuel cell C with the anode electrode layer 3 facing down is placed above a combustion device 4 to which a fuel gas is supplied, and power is generated by directly exposing the anode electrode layer 3 to a flame f formed by the combustion of the fuel. A fuel that burns and oxidizes by forming a flame is supplied as the fuel to the combustion device 4. As the fuel, phosphorus, sulfur, fluorine, chlorine, or their compounds may be used, but an organic substance that does not need exhaust gas treatment is preferable. Such organic fuels include, for example, gases such as methane, ethane, propane, and butane, gasoline-based liquids such as hexane, heptane, octane, alcohols such as methanol, ethanol, and propanol, ketons such as acetone, and various other organic solvents, edible oil, kerosene, paper, wood, etc. Of these fuels, a gaseous fuel is particularly preferable.

Further, the flame may be a diffusion flame or a premixed flame, but the premixed flame is preferred for use, because the diffusion flame is unstable and tends to incur degradation of the performance of the anode electrode layer due to the production of soot. The premixed flame is not only stable but the flame size is easily adjustable, and in addition, the production of soot can be prevented by adjusting the fuel density. As the solid oxide fuel cell is formed in a flat plate shape, the flame f produced by the combustion device 4 can be applied uniformly over the anode electrode layer 3 of the solid oxide fuel cell C, that is, compared with the tubular type, the flame f can be applied more evenly. Furthermore, the anode electrode layer 3 can be easily utilized as the fuel to generate electric power and the cathode electrode layer side can be maintained in an oxygen-rich condition.

The electric power generated by the solid oxide fuel cell C is taken between lead wires L1 and L2 brought out from the cathode electrode layer 2 and the anode electrode layer 3, respectively. For the lead wires L1 and L2, heat resistant platinum or a platinum-containing alloy is used.

Figure 5:
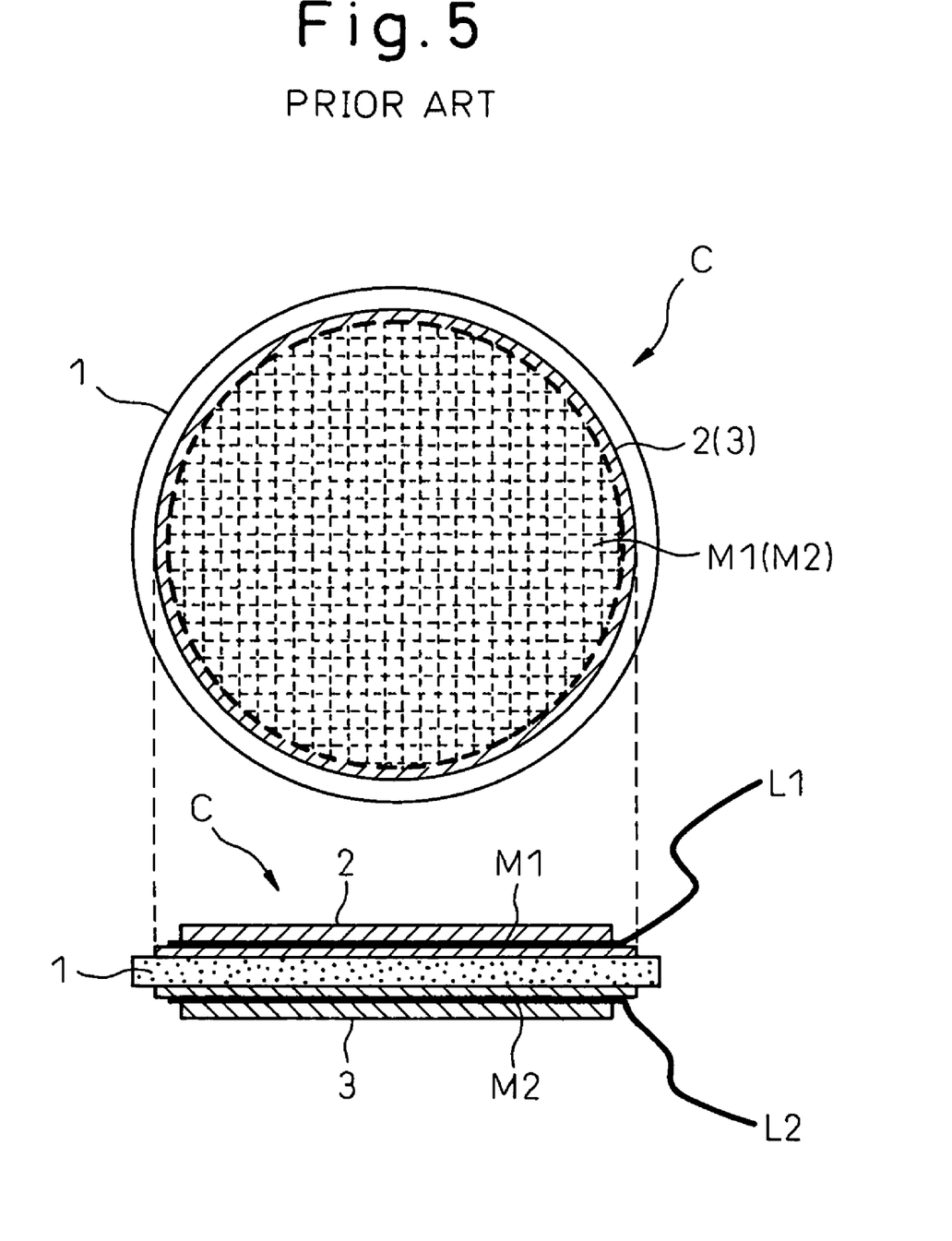
FIG. 5 is a diagram for explaining the detailed construction of the solid oxide fuel cell in FIG. 4.

FIG. 5 shows the top plan view and the cross-sectional view of the proposed solid oxide fuel cell C as an example in which the fuel cell is formed in a circular shape. In order to increase the durability of the solid oxide fuel cell, metal meshes or metal wires M1 and M2 are embedded in or fixed to the cathode electrode layer 2 and the anode electrode layer 3 in the fuel cell. The metal meshes or the metal wires are used as a current collecting electrode of the solid oxide fuel cell to increase the current collecting efficiency.

Further, the cathode electrode layer 2 and the anode electrode layer 3 are formed so as to have an area smaller than the area of the solid oxide substrate 1. There may be the case where the metal meshes or the metal wires M1 and M2 are formed so as to have an area smaller than the area of the cathode electrode layer 2 and the anode electrode layer 3, or formed in a portion thereof. Therefore, at the periphery part of the solid oxide substrate 1, the substrate surface is exposed to a predetermined width. This also applies to the rectangular solid oxide fuel cell.

As described above, the metal meshes or the metal wires were embedded or fixed at least in or to one of the cathode electrode layer and the anode electrode layer and the presence of the metal meshes or the metal wires resulted in that even individual fuel cells which was cracked and disintegrated in pieces were electrically connected with each another, and thus an influence on the power generation was prevented as a whole.

However, as shown in FIG. 5, even in the case where the metal meshes or the metal wires are provided in each electrode layer, the individual fuel cells cracked and disintegrated in pieces were electrically connected in parallel by the metal meshes or the metal wires and the ability to generate electric power is maintained but, as described above, at the periphery part of the solid oxide substrate 1, the substrate surface is exposed with a predetermined width, therefore, there has been the problem that cracking occurs also in the periphery part of the solid oxide substrate on which none of the electrode layers is formed and, as a result, the solid oxide fuel cell cannot be used any more.

In view of the above, next, the embodiments of the solid oxide fuel cell that directly utilizes a flame according to the present invention capable of solving these problems will be described with reference to FIG. 1. First, the basis of the solid oxide fuel cell that can be used in the present embodiments will be described below.

The structure of the solid oxide fuel cell used in the present embodiments is basically the same as that of the solid oxide fuel cell C shown in FIG. 4, and comprises the solid oxide substrate 1, the cathode electrode layer 2, and the anode electrode layer 3.

The solid oxide substrate 1 is, for example, a flat plate, circular or rectangular in shape, and the cathode electrode layer 2 and the anode electrode layer 3 are respectively formed over almost the entire surfaces of the flat solid oxide substrate 1 in such a manner as to face each other with the solid oxide substrate 1 interposed therebetween, apart from the periphery part of the substrate. The lead wire L1 is connected to the cathode electrode layer 2 and the lead wire L2 to the anode electrode layer 3, and the fuel cell output is taken between the lead wires L1 and L2.

For the solid oxide substrate 1, known materials can be used and examples include the following:

a) YSZ (yttria-stabilized zirconia), ScSZ (scandia-stabilized zirconia), and zirconia-based ceramics formed by doping these materials with Ce, Al, etc.

b) SDC (samaria-doped ceria), GDC (gadolinium-doped ceria), and other ceria-based ceramics.

c) LSGM (lanthanum gallate) and bismuth oxide-based ceramics.

For the anode electrode layer 3, known materials can be used and examples include the following:

d) Cermet of nickel and a ceramic based on yttria-stabilized zirconia or scandia-stabilized zirconia or a ceramic based on ceria (SDC, GDC, YDC, etc.).

e) Sintered material composed principally of electrically conductive oxide (50% to 99% by weight) (electrically conductive oxide is, for example, nickel oxide containing lithium in solid solution).

f) Material given in d) or e) to which a metal made of a platinum-group element or its oxide is added in an amount of about 1% to 10% by weight.

Of these materials, d) and e) are particularly preferable.

The sintered material composed principally of electrically conductive oxide given in e) has excellent oxidation resistance and, therefore, can prevent a phenomena resulting from the oxidation of the anode electrode layer, such as delamination of the anode electrode layer from the solid oxide layer and degradation of power generation efficiency or inability to generate power due to the rise in the electrode resistance of the anode electrode layer. For the electrically conductive oxide, a nickel oxide containing lithium in solid solution is preferable. It will also be noted that high power generation performance can be obtained by adding a metal made of a platinum-group element or its oxide to the material given in d) or e).

For the cathode electrode layer, known materials, which contain an element, such as lanthanum, selected form group III of the periodic table and doped with strontium (Sr), can be used, examples include a manganic acid compound (for example, lanthanum strontium manganite), a gallium acid compound and cobalt acid compound (for example, lanthanum strontium cobaltite).

The cathode electrode layer 2 and the anode electrode layer 3 are both formed in a porous structure. For these electrode layers, the porosity of the porous structure should be set to 20% or higher, preferably 30 to 70%, and more preferably 40 to 50%. In the solid oxide fuel cell in the present embodiments, the cathode electrode layer 2 and the anode electrode layer 3 are both formed in a porous structure, thereby making it easier to supply the oxygen in the air over the entire surface of the interface between the cathode electrode layer 2 and the solid oxide substrate 1 and also making it easier to supply the fuel over the entire surface of the interface between the anode electrode layer 3 and the solid oxide substrate 1.

Although normally formed in a closely compacted structure, the solid oxide substrate 1 can be formed also in a porous structure. The solid oxide substrate formed in a closely compacted structure would have a lower thermal shock resistance and would tend to crack easily when subjected to rapid temperature changes. Furthermore, as the solid oxide substrate is generally formed thicker than the anode electrode layer and the cathode electrode layer, any crack occurring in the solid oxide substrate would lead to the formation of cracks in the entire structure of the solid oxide fuel cell unit which would eventually disintegrate into pieces.

When the solid oxide substrate 1 is formed in a porous structure, its thermal shock resistance increases, and defects such as cracking do not occur even when the substrate is subjected to rapid temperature changes or to a heat cycle involving rapid changes in temperature during power generation. Further, when the porous structure was fabricated with a porosity of less 10%, no appreciable improvement in thermal shock resistance was observed, but when the porosity was 10% or higher, good thermal shock resistance was observed, and a better result was obtained when the porosity was increased to 20% or higher. This is presumably because, when the solid oxide substrate is formed in a porous structure, thermal expansion due to heating is absorbed by the pores in the porous structure.

The solid oxide fuel cell C is fabricated, for example, in the following manner. First, powders of materials for forming the solid oxide substrate are mixed in prescribed proportions, and the mixture is molded into a plate shape. After that, the plate-like structure is calcined and sintered to produce the solid electrolytic solid oxide substrate. Here, by adjusting the kinds and proportions of the powder materials including a pore-forming agent and the calcination conditions such as calcination temperature, calcination time, preliminary calcination, etc., solid oxide substrates with various porosities can be produced. A paste is applied in the shape of a cathode electrode layer on one surface of the solid oxide substrate thus obtained, and a paste is applied in the shape of an anode electrode layer on the opposite surface thereof, thereafter, the entire structure is dried and calcined to complete the fabrication of a single solid oxide fuel cell.

As described above, as a method for increasing the durability of the solid oxide fuel cell, FIG. 5 shows that the metal meshes or the metal wires are embedded in or fixed to the cathode electrode layer and the anode electrode layer of the fuel cell. In a method for embedding the metal meshes or the metal wires in each electrode layer, the material (paste) of each electrode layer is applied over the solid oxide substrate 1 and then dried, and thus the cathode electrode layer and the anode electrode layer are formed.

Next, the metal meshes or the metal wires M1 are placed on the cathode electrode layer and the material (paste) of the electrode layer is applied and then dried. Further, the metal meshes or the metal wires M2 are placed on the anode electrode layer and the material (paste) of the electrode layer is applied and then dried. After this, the entire layer is calcined and thus the cathode electrode layer 2 and the anode electrode layer 3, in which the metal meshes or the metal wires are embedded, are formed.

In the above case, the metal meshes or the metal wires are embedded in the material of each electrode layer to be applied, however, in a method for fixing these metals to each electrode layer, in the stage where the material is applied to the cathode electrode layer 2 and the anode electrode layer 3, the metal meshes or the metal wires are fixed thereto instead of being fully embedded therein. After this, the metal meshes or the metal wires may be fixed thereto by calcining the entire surface.

For the metal mesh or metal wire, a material that has excellent heat resistance, and that well matches the thermal expansion coefficient of the cathode electrode layer and anode electrode layer which the metal meshes or the metal wires are to be embedded in or fixed to, is preferred for use. Specific examples include a platinum metal and a platinum-containing metal alloy formed in the shape of a mesh or wire. Alternatively, a stainless steel of the SUS 300 series (for example, 304, 316, etc.) or the SUS 400 series (for example, 430, etc.) may be used and these materials are advantageous in terms of cost.

When the metal meshes or the metal wires are embedded in or fixed to the anode electrode layer and the cathode electrode layer, the size of mesh, the shape of mesh, the number of meshes, etc., are selected according to circumstances. By embedding or fixing the metal meshes or the metal wires in or to the anode electrode layer and the cathode electrode layer, the solid oxide substrate is reinforced so as to prevent the solid oxide substrate being cracked, due to thermal history, and disintegrating into pieces and, further, the metal meshes or the metal wires maintain the cracked portions in a state of being electrically connected with each another, resulting in that small chip-shaped solid oxide fuel cells are connected in parallel.

The above-mentioned measures after cracking can also be applied to the case where the solid oxide substrate is formed in a porous structure, but it will be recognized that when the solid oxide substrate of the fuel cell is formed in a closely compacted structure, the metal meshes or the metal wires embedded in or fixed to the cathode electrode layer and the anode electrode layer provide particularly effective means to cope with, particularly, the problem of cracking due to thermal history.

Further, it is desirable that the metal meshes or the metal wires be provided, in the anode electrode layer and the cathode electrode layer, respectively, in the area ranging from not less than 50% to not more than 100% of the boundary area between the solid oxide substrate and each electrode layer. In particular, the metal may be partially provided in order to reinforce a portion of the solid oxide substrate likely to crack. In view of this, in the example in FIG. 5, a state in which the metal meshes or the metal wires are provided inside of the outer circumference of each electrode layer is shown.

The metal meshes or the metal wires may be provided in both the anode electrode layer and the cathode electrode layer or in either one of the layers. Further, the metal meshes and the metal wires may be used in combination. When the metal meshes or the metal wires are embedded or fixed at least in or to the anode electrode layer, then if cracking occurs due to thermal history, the power generation performance of the fuel cell does not degrade and the fuel cell can continue to generate power. As the power generation performance of the solid oxide fuel cell is largely dependent on the effective area of the anode electrode layer as the fuel electrode, the metal meshes or the metal wires should be provided at least in the anode electrode layer.

However, in the solid oxide fuel cell thus formed, even if the metal meshes or the metal wires are embedded in or fixed to the cathode electrode layer and the anode electrode layer, the metal meshes or the metal wires are not provided at the periphery portion of the solid oxide substrate, as shown in FIG. 5. Because of this, although the power generation performance of the fuel cell does not degrade due to the metal meshes or the metal wires even if cracking occurs in each electrode layer portion, there has been the case where cracking occurs at the periphery portion of the solid oxide substrate due to thermal shock resulting from rapid heating by a flame and a state is brought about in which the fuel cell cannot be used.

In view of this, measures against cracking at the periphery portion of the solid oxide substrate of the solid oxide fuel cell will be described below by a first embodiment in which an oxide layer is formed at the periphery of a solid oxide substrate and a second embodiment in which metal meshes or metal wires are provided in an area larger than the area of a cathode electrode layer and an anode electrode layer.

First Embodiment

Figure 1:
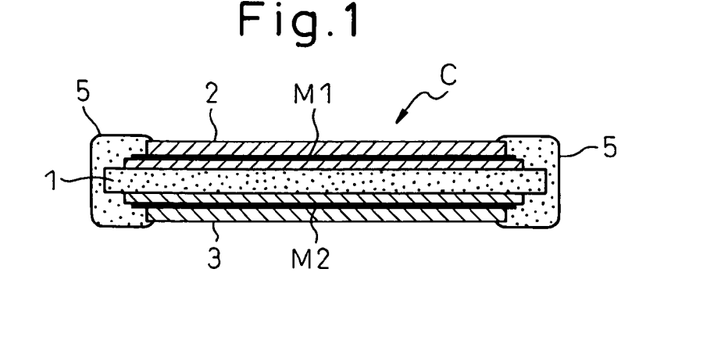
FIG. 1 is a diagram for explaining a general construction of a solid oxide fuel cell according to a first embodiment of the present invention.

The construction of a solid oxide fuel cell according to a first embodiment is shown in FIG. 1. FIG. 1 shows a cross-sectional view of the solid oxide fuel cell C and the solid oxide fuel cell C is based on the construction of the solid oxide fuel cell C shown in FIG. 5 and the same parts are designated by the same reference characters.

In the solid oxide fuel cell C shown in FIG. 1 also, the metal meshes or the metal wires M1 and M2 are embedded in or fixed to the cathode electrode layer 2 and the anode electrode layer 3 in order to increase durability of the solid oxide fuel cell. The metal mesh or the metal wire functions as a current collecting electrode of the solid oxide fuel cell and, as shown in FIG. 5 but not shown in FIG. 1, the lead wires L1 and L2 are connected and the power generation output is taken.

Further, the cathode electrode layer 2 and the anode electrode layer 3 are formed so as to have an area smaller than the area of the solid oxide substrate 1 and the metal meshes or the metal wires M1 and M2 are formed so as to have an area smaller than the area of the cathode electrode layer 2 and the anode electrode layer 3, therefore, on the surface of the periphery portion of the solid oxide substrate 1, the cathode electrode layer or the anode electrode layer is not formed.

In the proposed solid oxide fuel cell C shown in FIG. 5, the anode electrode layer 3 is directly exposed to a flame and, when the solid oxide substrate 1 is heated rapidly, thermal shock is applied also to the periphery portion of the solid oxide substrate 1 where the cathode electrode layer or the anode electrode layer is not formed and cracking occurs. In view of this, in the solid oxide fuel cell in the first embodiment, an oxide layer 5 is formed on the entire periphery portion of the solid oxide substrate 1 from the end portion of the cathode electrode layer 2 to the end portion of the anode electrode layer 3, as shown in FIG. 1, in order to prevent cracking from occurring in the periphery portion of the solid oxide substrate 1. If the solid oxide fuel cell C is circular in shape, the oxide layer 5 will be annular in shape, the section being a reversed-C shape.

The oxide layer 5 is an electrically insulating oxide and can be formed from a solid electrolyte, for example, SDC, which forms the solid oxide substrate 1 and can be formed not only in a closely compacted structure but also in a porous structure. The oxide layer is formed after the material (paste) of each electrode layer is applied over the solid oxide substrate 1 and then dried, and the cathode electrode layer and the anode electrode layer which the metal meshes or the metal wires are embedded in or fixed to are formed. The SDC paste is thickly applied on the exposed surface on which the electrode layer of the solid oxide substrate 1 is not formed and then the surface is dried. After this, the surface is calcined together with each electrode layer and thus fabrication is completed.

As described above, in the solid oxide fuel cell in the first embodiment, the oxide layer 5 is formed from the end portion of the cathode electrode layer 2 to the end portion of the anode electrode layer 3 on the exposed surface on which each electrode layer of the solid oxide substrate 1 is not formed, therefore, the portion at which the oxide layer 5 is formed is thick and effective as reinforcement against thermal shock, and thus cracking of the periphery portion of the solid oxide substrate can be prevented from occurring.

Next, a modified example of the solid oxide fuel cell in the first embodiment will be described with reference to FIGS. 2A and 2B. So far, the case where one fuel cell is formed on the solid oxide substrate as the solid oxide fuel cell C being the basic construction is described. In this case, as in the solid oxide fuel cell C shown in FIG. 1 described above, if formed in an annular shape the section of which is a reversed-C shape, it is possible for the oxide layer to prevent cracking of the periphery portion of the solid oxide substrate from occurring.

By the way, in the case where a plurality of solid oxide fuel cells are formed on one solid oxide substrate, the exposed portion of surface on which each electrode layer is not formed exists not only at the periphery portion of the solid oxide substrate but also at the inward portion of the solid oxide substrate surface and when the portion is directly exposed to a flame and the solid oxide substrate 1 is heated rapidly, thermal shock is applied also to the inward portion of the solid oxide substrate and cracking occurs.

Figure 2A:
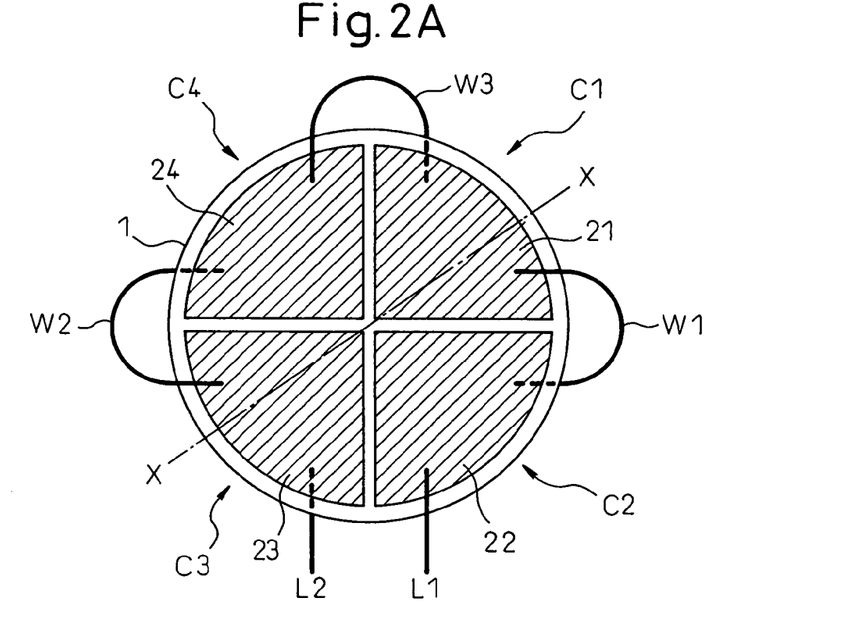
FIG. 2A and FIG. 2B are diagrams for explaining a modified example of the solid oxide fuel cell according to the first embodiment.

An example of the case where a plurality of solid oxide fuel cells are formed on one solid oxide substrate is shown in FIG. 2A. In FIG. 2A, four cathode electrode layers 21 to 24 are formed on a surface of the solid oxide substrate 1 and four anode electrode layers 31 to 34 (not shown in FIG. 2A) are formed on the opposite surface. For example, one fuel cell is constructed from the cathode electrode layer 21 and the anode electrode layer 31 and four solid oxide fuel cells C1 to C4 are constructed on one solid oxide substrate from each of four sets of cathode electrode layer and anode electrode layer in opposition to each other. Formation is not limited to the formation of such four fuel cells and formation can be achieved with an arbitrary number (two or more) of sets according to circumstances.

Then, in order to take the power generation output of the fuel cell, the lead wire L1 is attached to the cathode electrode layer 22 and to the anode electrode layer 33 also, the lead wire L2 is attached. Further, in order to connect in series a plurality of solid oxide fuel cells, connecting wires W1 to W3 are provided and as shown in FIG. 2A, the connecting wire W1 electrically connects, for example, the cathode electrode layer 21 and the anode electrode layer 32. The lead wires and the connecting wires are formed from a heat-resistant platinum material or a platinum-containing alloy. An output as large as the sum of the electromotive forces of the four fuel cells can be obtained between the lead wire L1 and the lead wire L2.

In the solid oxide fuel cell shown in FIG. 2A, as the four fuel cells C1 to C4 are connected in series, the connecting wires W1 to W3 connect the cathode electrode layer and the anode electrode layer across the outside of the solid oxide substrate 1. These connecting wires have a shape that protrudes toward the outside of the solid oxide substrate, therefore, there may be the case where these connecting wires can be obtrusive. In view of this, it is also possible to provide a via in the portion where the cathode electrode layer or the anode electrode layer is not formed and connect the cathode electrode layer and the anode electrode layer through the via in the solid oxide substrate 1.

Here, as can be seen also from the solid oxide fuel cell C in FIG. 2, when a plurality of solid oxide fuel cells are formed on the common solid oxide substrate 1, an exposed portion of the substrate on which each electrode layer is not formed exists in a cross shape at the inward portion of the solid oxide substrate in the example in FIG. 2A. This leads to the possibility that when the solid oxide substrate 1 is heated rapidly by being exposed directly to a flame, thermal shock may be applied also to the inward portion of the solid oxide substrate and cracking may occur also in the exposed portion of the substrate.

Figure 2B:
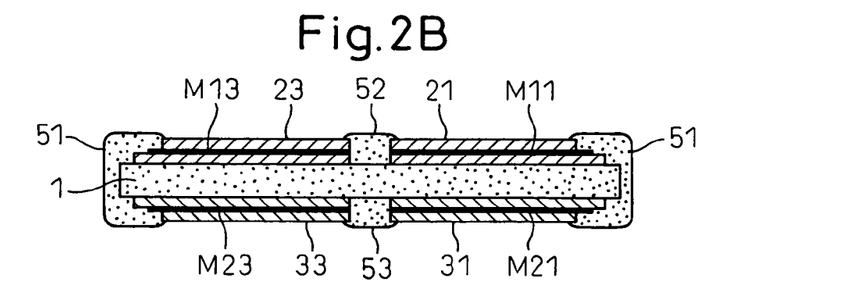

In the modified example of the first embodiment, as shown in FIG. 2B, the oxide layer used as measures to prevent occurrence of cracking shown in FIG. 1 is also provided at the exposed portion of the substrate located at the inward portion of the solid oxide substrate. FIG. 2B shows a cross-sectional view along the X-X line shown in FIG. 2A. The structure of the solid oxide fuel cell shown in FIG. 2A is basically the same as that of the solid oxide fuel cell in FIG. 1, however, the solid oxide fuel cell C is formed by dividing into the four solid oxide fuel cells C1 to C4. Since each of the solid oxide fuel cells C1 to C4 of the modified example shown in FIG. 2A is the same as the case shown in FIG. 1, the metal meshes or the metal wires are provided in both the anode electrode layers and the cathode electrode layers in the solid oxide fuel cells of the modified example. Accordingly, as shown in FIG. 2B, the metal meshes or the metal wires M11 and M13 are provided in the cathode electrode layers and M21 and M23 are provided in the anode electrode layers.

The solid oxide fuel cell shown in FIG. 2A differs from the solid oxide fuel cell C shown in FIG. 1 in that the exposed portion of substrate on which each electrode layer is not formed exists at the inward portion of the solid oxide substrate when the plurality of solid oxide fuel cells C1 to C4 are formed. Because of this, in the modified example of the first embodiment, as shown in FIG. 2B, an oxide layer 51 is formed at the periphery portion of the solid oxide substrate 1 and at the same time, oxide layers 52 and 53 are formed also on the exposed portion of substrate at the inward portion of the substrate. The oxide layer 52 is formed at the exposed portion of substrate that exists on the cathode electrode layer side and the oxide layer 53 on the exposed portion of substrate that exists on the anode electrode layer side.

The formation of the oxide layers 52 and 53 is the same as the formation of the oxide layer 51 and both are performed at the same time. In this manner, when the solid oxide substrate 1 is heated rapidly by being exposed directly to a flame, if thermal shock is applied to the inward portion of the solid oxide substrate, the substrate can withstand the thermal shock and occurrence of cracking of the exposed portion of substrate can be prevented.

Second Embodiment

Figure 3:
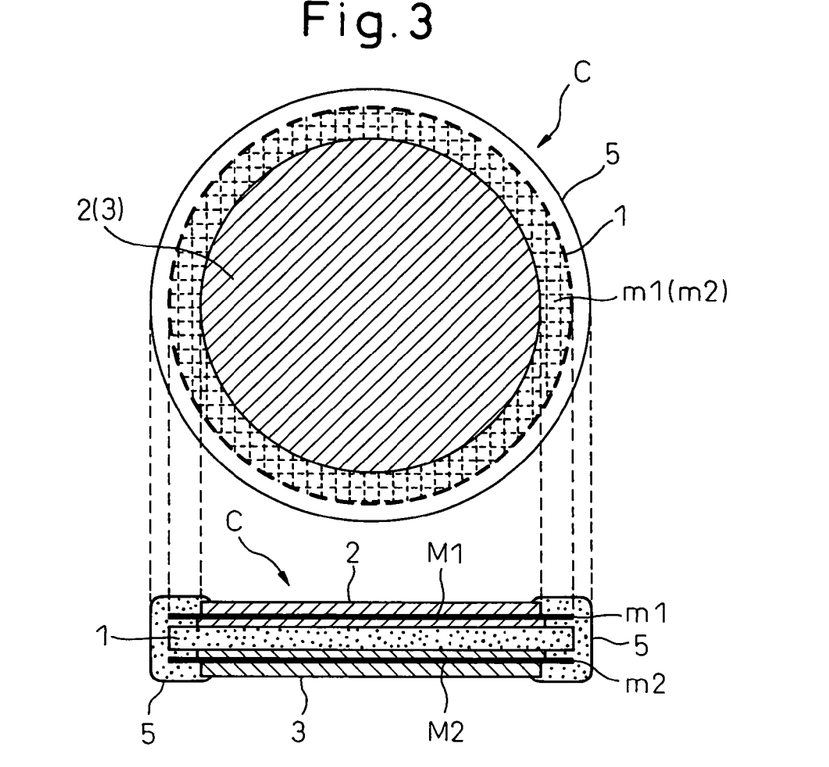
FIG. 3 is a diagram for explaining a general construction of a solid oxide fuel cell according to a second embodiment of the present invention.

Next, a second embodiment of the solid oxide fuel cell according to the present invention, in which the metal meshes or the metal wires are provided so as to have an area larger than the area of the cathode electrode layer and the anode electrode layer, will be described below with reference to FIG. 3. The structure of the solid oxide fuel cell shown in FIG. 3 is basically the same as that of the solid oxide fuel cell C in the first embodiment shown in FIG. 1 and the same parts are designated by the same reference characters.

Here, an experiment was conducted regarding the occurrence of cracking of the solid oxide substrate due to a heating flame with modified arrangement of the metal meshes in the solid oxide fuel cell. On the assumption that the cathode electrode layer and the anode electrode layer in the above-described solid oxide fuel cell can be ignored in terms of heat conductivity because they are normally formed in a porous structure and are thinner than the solid oxide substrate, in this experiment, a solid oxide substrate formed from SDS was provided having a diameter of 20 mm and a thickness of 0.2 mm and not having the cathode electrode layer or the anode electrode layer.

Here, the following solid oxide substrates were formed.

a) A solid oxide substrate in which metal meshes were fixed to neither of the surfaces.

b) Two kinds of solid oxide substrates in which metal meshes having a diameter of 15 mm were fixed to one surface or both surfaces.

c) Two kinds of solid oxide substrates in which metal meshes having a diameter of 20 mm were fixed to one surface or both surfaces.

d) A solid oxide substrate in which metal meshes having a diameter of 15 mm were fixed to one surface and metal meshes having a diameter of 20 mm were fixed to the other surface.

In the experiment, a high temperature part having a diameter of about 10 mm was formed initially in the center of one surface of the respective solid oxide substrates formed in a) to d) by directly exposing the center to a premixed gas combustion flame produced by a burner and cracking was observed. In the case of a), cracking occurred in the center of the solid oxide substrate and in the case of b), corresponding to the case in FIG. 4, cracking occurred at the periphery portion of the solid oxide substrate located on the outer circumference of the metal meshes, but in the cases of c) and d), cracking did not occur on the entire surface of the solid oxide substrate.

While the thermal conductivity of the solid oxide substrate is about 2 $[Wm^{-1}K]$, the thermal conductivity is about 72 $[Wm^{-1}K]$ in the case where the metal meshes are platinum, about 16.3 $[Wm^{-1}K]$ in the case of SUS304 stainless, and about 26.3 $[Wm^{-1}K]$ in the case of SUS430 stainless.

From the above, if the circumstances in which the above-described cracking occurs is taken into consideration, it can be seen that, at the portion at which the metal meshes exist, heat transfers more quickly to the solid oxide substrate and thermal shock is small because the thermal conductivity of the metal meshes is higher than the thermal conductivity of the solid oxide substrate. Therefore, if the metal meshes are provided at least on the entire surface of one surface of the solid oxide substrate, the substrate becomes unlikely to crack even if the substrate is directly and rapidly exposed to a flame.

Therefore, in the solid oxide fuel cell in the second embodiment, based on the above knowledge, the metal meshes or metal wires are provided which extend over and beyond the cathode electrode layer and the anode electrode layer, or which extend on the entire surface of the solid oxide substrate in order to prevent the solid oxide substrate from cracking due to rapid heating by a flame. FIG. 3 shows an example of the solid oxide fuel cell according to the second embodiment, in which the metal meshes or the metal wires M1 and M2 are provided so as to extend over the entire surface of the solid oxide substrate 1, covering over and beyond the cathode electrode layer 2 and the anode electrode layer 3.

The structure of the solid oxide fuel cell shown in FIG. 3 is the same as that of the solid oxide fuel cell, shown in FIG. 1, comprising the solid oxide substrate 1, the cathode electrode layer 2, and the anode electrode layer 3, wherein the metal meshes or the metal wires M1 are embedded in or fixed to the cathode electrode layer 2. On the other hand, the metal meshes or the metal wires M2 are embedded in or fixed to the anode electrode layer 3 also. Here, the second embodiment differs from the metal meshes or the metal wires M1 and M2 in the solid oxide fuel cell in FIG. 1 in that the metal meshes and the metal wires M1 and M2 have extension portions m1 and m2 and extend over the entire surface of the solid oxide substrate 1, covering over and beyond the region in which the cathode electrode layer 2 and the anode electrode layer 3 are formed. The extension portions m1 and m2 are covered with the oxide layer 5 and fixed to the solid oxide substrate 1.

According to the above-described experimental example, how the metal meshes or the metal wires of the solid oxide fuel cell shown in FIG. 3 are arranged corresponds to the case where the metal meshes are provided on both surfaces in c), and thermal shock due to rapid heating by a flame is alleviated, and cracking can be prevented from occurring in the entire solid oxide substrate. In this case, the oxide layer 5 prevents a short circuit between electrodes. On the other hand, as can be seen from the experimental example d), even if the extension portion m1 of the metal meshes or the metal wires provided in the cathode electrode layer 2 is omitted, effects as measures against cracking in the solid oxide substrate can be obtained.

In the case where the metal meshes are provided on one surface in c) also, effects as measures against cracking in the solid oxide substrate can be obtained. However, in this case, if applied as the solid oxide fuel cell in the second embodiment, the flame supplied to the solid oxide fuel cell is bound to face the anode electrode layer side, therefore, if thermal conductivity is taken into consideration, it will be effective to remove the metal meshes M1 and the extension portion m1 to leave only the anode electrode layer side and to provide the metal meshes M2 and the extension portion m2.

In the solid oxide fuel cell C in the second embodiment shown in FIG. 3, the extension portions m1 and m2 of the metal meshes M1 and M2 provided in each electrode layer are provided in the range to the periphery end of the solid oxide substrate 1 to cover all of the portions on the substrate on which each electrode layer is not formed, however, if thermal conduction takes places smoothly at the portions on the substrate, the effects as measures against cracking in the solid oxide substrate can be obtained when the metal meshes are only provided beyond each electrode layer, and not covering all of the portions on the substrate.

The case is described so far where the solid oxide fuel cell in the second embodiment is utilized in a power generating apparatus as a single fuel cell, however, it is also possible to connect a plurality of solid oxide fuel cells in the present embodiment to use as a power generating apparatus and to adjust the magnitude of its power generation output.

When a plurality of solid oxide fuel cells are connected in series, the metal meshes or the metal wires M2 in the anode electrode layer 3 provided in the solid oxide fuel cell having the structure shown in FIG. 3 are extended and connected to the metal meshes or the metal wires M1 in the cathode electrode layer 2 in another neighboring solid oxide fuel cell, and if there exists still another solid oxide fuel cell, this connection is repeated. Then, the power generation output is taken between the metal meshes or the metal wires M1 in the cathode electrode layer in the solid oxide fuel cell in question and the metal meshes or the metal wires M2 in the anode electrode layer in the last other solid oxide fuel cell. In this case, the effects resulting from the above-described extension portion m2 can be obtained by extending the metal meshes or the metal wires M2 in the anode electrode layer 3.

When a plurality of solid oxide fuel cells are connected in parallel, the metal meshes or the metal wires M2 in the respective anode electrode layers 3 provided in the plurality of solid oxide fuel cells having the structure shown in FIG. 3 are extended and connected to each another and further, the metal meshes or the metal wires M1 in the cathode electrode layer 2 in each of the solid oxide fuel cells are extended and connected to each another. Then, the power generation output is taken between the metal meshes or the metal wires M1 in the cathode electrode layer 2 and the metal meshes or the metal wires M2 in the anode electrode layer 3. In this case also, the effects resulting from the above-described extension portions m1 and m2 can be obtained by extending the metal meshes or the metal wires M1 in the cathode electrode layer 2 and the metal meshes or the metal wires in the anode electrode layer 3.

EXAMPLES

An example will be described below for the solid oxide fuel cell of the second embodiment described above. A solid oxide fuel cell was fabricated in accordance with the structure of the solid oxide fuel cell shown in FIG. 3, and a power generation experiment was conducted using a premixed gas combustion flame produced by a burner.

First, a solid electrolyte formed from samaria-doped ceria (SDC, $Sm_{0.2} Ce_{0.8} O_{1.9}$ ceramic) was used as the solid oxide substrate. Using a green sheet process, the solid electrolyte was calcined at 1300° C. in the atmosphere to produce a ceramic substrate with a diameter of 15 mm. Next, a paste prepared by mixing samaria strontium cobaltite (SSC, $Sm_{0.2} Sr_{0.5} Ce_{0.8} O_3$) and SDC in proportions of 50% by weight to 50% by weight was applied on one surface of the substrate to print a circular pattern with a diameter of 13 mm, less than that of the substrate, and the paste was dried.

Further, a paste prepared by mixing nickel oxide containing 8% by mole of lithium in solid solution and SDC in proportions of 60% by weight to 40% by weight, with 5% by weight of rhodium oxide added thereto, was applied on the opposite surface of the substrate to print a pattern with a diameter of 13 mm, the same diameter as that of the substrate, and a platinum mesh as a collecting electrode was embedded in each surface, and then dried. Thereafter, the exposed portion of the platinum mesh on the periphery portion was applied with an SDC paste thickly and dried, and the entire structure was calcined at 1200° C. in the atmosphere to produce a single circular solid oxide fuel cell unit.

In the fabricated solid oxide fuel cell in the present example, as shown in FIG. 3, the platinum mesh is formed so as to have the same area as that of the solid oxide substrate on the cathode electrode layer side and the anode electrode layer side, and at the periphery portion of the solid oxide substrate, the oxide layer is provided in such a manner that the periphery portion of the platinum mesh is embedded. On the other hand, for comparison, a solid oxide fuel cell having a conventional structure shown in FIG. 5 was also fabricated in the same procedure described above.

The solid oxide fuel cell in the present example and the solid oxide fuel cell having a conventional structure were each heated rapidly by a premixed gas combustion flame, which was a premixed gas of a butane gas and air burnt by a burner. The result was that cracking and chipping occurred at the periphery portion of the solid oxide substrate in the solid oxide fuel cell having a conventional structure, while no cracking or chipping occurred in the solid oxide fuel cell in the present example.

What is claimed is:

1. A solid oxide fuel cell system comprising:
   a solid oxide fuel cell with
   a cathode electrode layer formed on one surface of a single solid oxide substrate, the cathode electrode layer having an area smaller than the area of the single solid oxide substrate;
   an anode electrode layer formed on a surface of said single solid oxide substrate opposite from said one surface, the anode electrode layer having an area smaller than the area of the single solid oxide substrate;

metal meshes or metal wires embedded in both of said cathode electrode layer and said anode electrode layer;

an oxide member encasing the entire periphery part of said single solid oxide substrate from the end part of said cathode electrode layer to the end part of said anode electrode layer, the oxide member formed in a porous structure and having a reversed-C shaped section; and a device supplying a flame produced by burning a fuel, which the device is placed in proximity to said anode electrode layer, wherein when said flame by burning is supplied to said anode electrode layer and an oxygen-containing gas is supplied to said cathode electrode layer, said oxide fuel cell generates electric power.

2. A solid oxide fuel cell system as claimed in claim 1, wherein said cathode electrode layer and said anode electrode layer are formed so as to have an area smaller than said surface of said single solid oxide substrate.

3. A solid oxide fuel cell system as claimed in claim 1, wherein said metal meshes or metal wires embedded in or fixed to said cathode electrode layer and said anode electrode layer are first current collecting electrodes and second current collecting electrodes and the power generation output is taken between lead wires connected to said first current collecting electrodes and said second current collecting electrodes.

4. A solid oxide fuel cell system as claimed in claim 1, wherein said metal meshes or metal wires are provided on the entire surface of said cathode electrode layer or said anode electrode layer.

5. A solid oxide fuel cell system as claimed in claim 1, wherein said oxide member is formed from a solid electrolyte.

6. A solid oxide fuel cell system as claimed in claim 3, wherein:
   on one surface of said single solid oxide substrate, a plurality of cathode electrode layers in or to which said first current collecting electrodes are embedded or fixed;
   on a surface of said single solid oxide substrate opposite from said one surface, a plurality of anode electrode layers in or to which said second current collecting electrodes are embedded or fixed;
   a plurality of solid oxide fuel cells are formed on said single solid oxide substrate; and
   the surface of said single solid oxide substrate between said plurality of cathode electrode layers and between said plurality of anode electrode layers is covered with said oxide layer.

7. A solid oxide fuel cell system as claimed in claim 1, wherein:
   periphery portions of said metal meshes or metal wires extend beyond the outer perimeter of said cathode electrode layer or said anode electrode layer; and
   the periphery portions of said metal meshes or metal wires are covered with said oxide layer.

8. A solid oxide fuel cell system as claimed in claim 7, wherein said metal meshes or metal wires provided in said anode electrode layer or said cathode electrode layer are connected to the cathode electrode layer or the anode electrode layer of another neighboring solid oxide fuel cell, or to metal meshes or metal wires provided in the anode electrode layer or the cathode electrode layer.

* * * * *